United States Patent [19]

Franchina

[11] 4,240,404
[45] * Dec. 23, 1980

[54] HEAT PUMP HAVING A TIMER ACTIVATED FURNACE

[76] Inventor: Antonino Franchina, 5219 Botsford St., Sterling Heights, Mich. 48077

[*] Notice: The portion of the term of this patent subsequent to Feb. 27, 1996, has been disclaimed.

[21] Appl. No.: 24,969

[22] Filed: Mar. 29, 1979

Related U.S. Application Data

[63] Continuation-in-part of Ser. No. 968,437, Dec. 11, 1978, Pat. No. 4,202,493, which is a continuation-in-part of Ser. No. 871,493, Jan. 23, 1978, Pat. No. 4,141,490.

[51] Int. Cl.$^3$ ............................................. F24D 11/00
[52] U.S. Cl. ..................... 126/427; 237/2 B; 165/DIG. 2; 126/400
[58] Field of Search ............... 126/422, 428, 429, 430, 126/110 R, 400, 427; 62/2, 238 E; 237/2 B; 165/DIG. 2, 29, 18

[56] References Cited

U.S. PATENT DOCUMENTS

| | | | |
|---|---|---|---|
| 3,972,183 | 8/1976 | Chubb | 126/433 |
| 4,066,118 | 1/1978 | Goetti | 62/2 |
| 4,141,490 | 2/1979 | Franchina | 237/2 B |

Primary Examiner—Lloyd L. King
Assistant Examiner—Henry Bennett

Attorney, Agent, or Firm—Gifford, VanOphem, Sheridan & Sprinkle

[57] ABSTRACT

A heating system for a building having a conventional gas furnace which includes a combustion chamber for heating air passing from a cold-air return to a hot-air duct is disclosed. The gas furnace includes an exhaust shack for exhausting hot gases from the combustion chamber externally of the building. The heating system includes a heat pump comprising a housing having a condenser for heating air passing thereby from the cold-air return to the hot-air duct. The gas furnace and heat pump are served by a single blower. The heat pump also includes an evaporator located externally of the building for drawing heat from the atmosphere. A timer is included to turn the furnace on when the heat pump has operated for a predetermined time in response to a demand for heat from a dwelling thermostat. The heating system includes a conduit connecting the exhaust stack to the evaporator such that exhaust gases from the gas furnace combustion chamber will be directed past the evaporator for permitting the recapture of stack heat for heating the building. The heating system includes a solar panel for heating air passed therethrough and a circuit for using the solar warmed air to warm the ambient air at the evaporator. A heat storage chamber is provided wherein air warmed by the solar panel may be stored for future use when the amount of solar warm air available exceeds the amount needed for heating the building.

8 Claims, 1 Drawing Figure

HEAT PUMP HAVING A TIMER ACTIVATED FURNACE

CROSS REFERENCE TO RELATED APPLICATIONS

This application is a continuation in part of copending application Ser. No. 968,437 filed Dec. 11, 1978, entitled "HEATING SYSTEM HAVING SOLAR ASSIST" which is now Pat. No. 4,202,493. The disclosure of which is incorporated by reference, which is a C-I-P of S.N. 871,493, Jan. 23, 1978 now U.S. Pat. No. 4,141,490.

BACKGROUND OF THE INVENTION

I. Field of the Invention

The present invention generally relates to heating devices and, in particular, the present invention is concerned with a heating system having a combined gas furnace and heat pump including a solar panel for providing heat to a building in an economical manner and a timer to activate the furnace after the heat pump has been on for a predetermined time.

II. Description of the Prior Art

In recent years there has been a deep concern by the public for the high cost of energy and, in particular, the cost of providing heat to homes, office buildings, and the like. A variety of methods have been proposed for drawing heat from the atmosphere, and heat pump cooling and air conditioning systems have been suggested as a solution. Such heat pump reversing or conversion systems have not yet met with full acceptance with the public in that they merely offer a different manner of heating rather than fulfilling their potentional as an additional heat source to be combined with heat generating systems of different types. Examples of heat pump conversion systems in the prior art are disclosed in U.S. Pat. Nos. 3,993,121; 3,996,998; 3,935,899; 3,777,508; 2,677,243; 3,844,233; and 4,050,628. These patents are relevant to applicant's invention in that they represent the closest prior art for utilizing heat pumps in conjunction with furnace systems to maximize the efficiency of obtaining heat for homes, office buildings, and the like.

III. Prior Art Statement

The aforementioned prior art, including the applicant's copending application, in the opinion of the applicant and applicant's attorney, represents the closest prior art of which applicant and applicant's attorney are aware.

SUMMARY OF THE INVENTION

The present invention, which will be described in greater detail hereinafter, comprises a heating system for heating homes, office buildings, and the like comprising a gas furnace connected between a cold-air return and a hot-air duct. The gas furnace includes a combustion chamber for heating air passing thereby from the cold-air return to the hot-air duct. An exhaust stack associated with the gas furnace exhausts the hot gases from the combustion chamber. The system has a heat pump comprising a condenser having an inlet communicating with the cold-air return and an outlet communicating with the hot-air duct. The heat pump has an evaporator located externally of the building for drawing heat from the atmosphere and communicating the same to the condenser to heat the air passing thereby. The gas furnace and heat pump use a common blower or fan. A first conduit communicates the hot exhaust gases from the exhaust stack past the evaporator to provide a simple and efficient means for reclaiming heat lost from the gas furnace. A solar panel is provided which is directed at the sun, to warm air passing therethrough. The solar warmed air is directed past the evaporator by a second conduit to use solar heat to augment the gas heat. A timer is provided to activate the furnace after the heat pump has been on for a predetermined time to warm the building.

It is therefore a primary object of the present invention to provide a new and improved heating system.

It is a further object of the present invention to provide such a heating system which combines a gas furnace and a heat pump to provide an efficient system for heating and cooling the air within a building.

It is yet another object of the present invention to provide a solar panel to improve the furnace efficiency.

It is a further object of the present invention to provide a heat storage chamber to store solar heat during periods when there is more solar energy available than needed and to give up the stored solar heat during periods of low solar heat availability.

It is another object of the present invention to provide a heating system combining a gas furnace and a heat pump wherein the heat pump reversibly functions to heat and cool the supply of air delivered to the heating system.

It is yet a further object of the present invention to provide a combination heating system having a furnace and heat pump arrangement which results in substantial fuel savings as compared with conventional heating systems.

It is yet another object of the present invention to provide an improved heating system which may be readily and inexpensively installed.

It is an additional object of this invention to provide a timer which activates the furnace after the heat pump has been on for a predetermined time to heat the dwelling before an uncomfortable temperature drop occurs.

Further objects, advantages, and applications of the present invention will become apparent to those skilled in the art of heating systems when the accompanying description of one example of the best modes contemplated for practicing the invention is read in conjunction with the accompanying drawing.

BRIEF DESCRIPTION OF THE DRAWING

The sole drawing is a schematic diagram of a heating system constructed in accordance with the principles of the present invention.

DESCRIPTION OF THE PREFERRED EMBODIMENT

Figure 1:
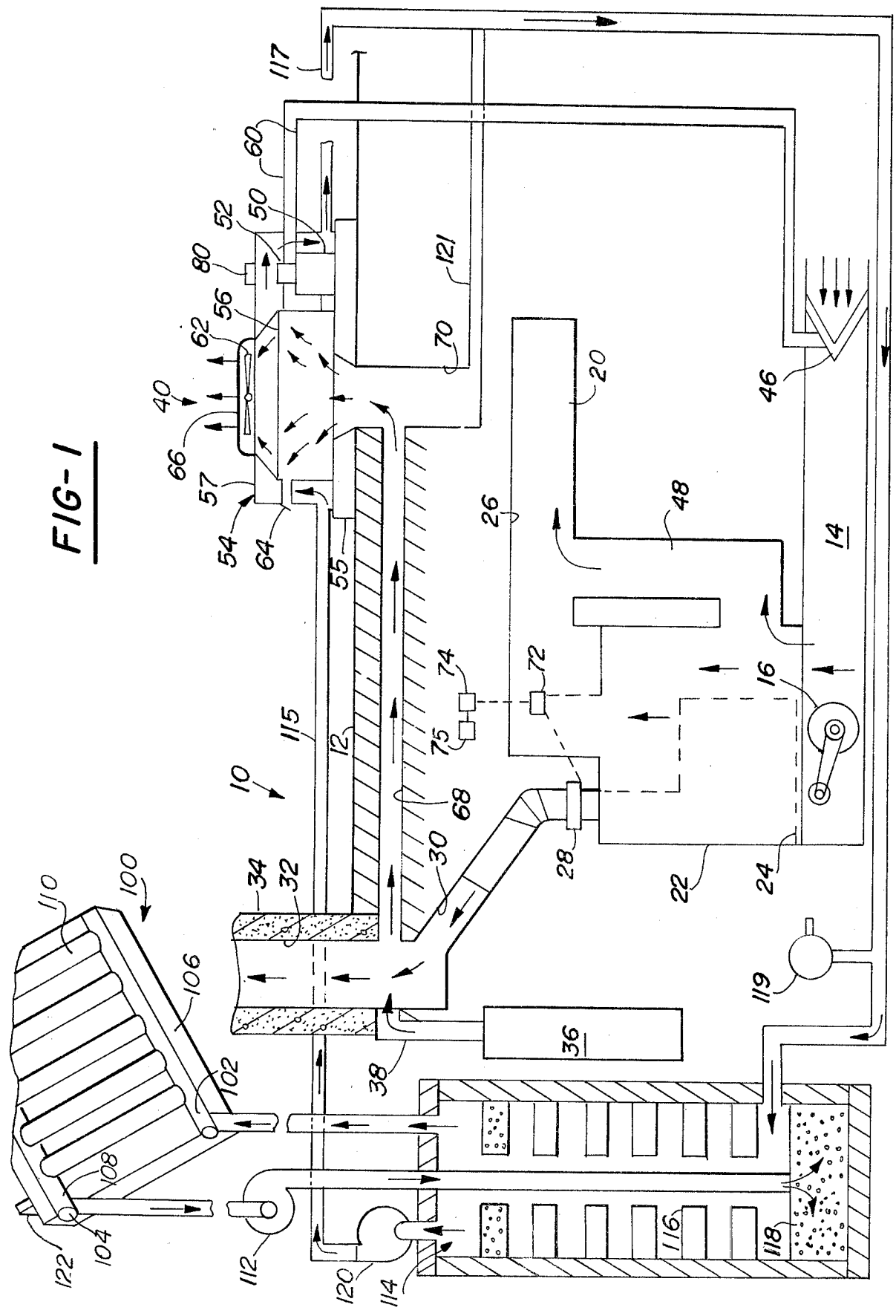

Referring now to the drawing, there is illustrated one example of the present invention in the form of a heating system 10. The system 10 is adapted to provide heat to the building 12 and includes a conventional forced-air system having a cold-air return 14 which includes a blower 16 used to circulate air through the forced-air system. The system also includes a hot-air duct 20, all of which functions in a conventional manner and needs no further description.

The heating system 10 includes a conventional gas furnace 22 having a combustion chamber 24 within which a fuel, such as gas, is ignited so as to heat the air passing from the cold-air return 14 to the hot-air duct 20 via a heat exchanger 25. The gases from the combustion chamber 24 are exhausted from the gas furnace 22 and a flue lock 28 to a conventional metal conduit 30 for communication to the exhaust stack 32 of a chimney 34. It should be noted that the building 12 includes a gas hot-water tank 36 having a combustion chamber for heating hot water within the tank 36 and an exhaust conduit 38 which communicates the burnt gases from the hot-water tank 36 to the exhaust stack 32 of the chimney 34.

The heating system 10 further comprises a heat pump 40 which includes an interior portion or housing 44 that mounts a condenser 46 which, as will be described hereinafter, functions to heat air passing from the cold-air return 14 through the heat pump 40 such that the heated air may be communicated via a by-pass duct 48 to the hot-air duct 20. The heat pump 40 includes a compressor 50 and a 4-way valve 52. The aforementioned components will be described in greater detail hereinafter. The heat pump 40 further comprises a housing 54 which is mounted externally of the building 12 on a concrete slab 55. The housing 54 mounts the compressor 50, the 4-way valve 52 and an evaporator 56 which communicates via suitable fluid conduits and the 4-way valve 52 with the compressor 50 and the condenser 46. The housing 54 further mounts a fan or blower element 62 which is adapted to draw air from the atmosphere through an inlet 64 past the evaporator 56 whereupon the air is exhausted through outlet 66. The exhaust stack 32 communicates with an underground duct 68 which, in turn, communicates with the bottom of the external housing 54 such that hot gases from the exhaust stack 32 may be communicated directly to the evaporator 56 and then exhausted into the atmosphere via the exhaust 66. The hot-gas conduit 68 is connected to the evaporator via a vertical conduit 70 which has a lower end connected to a suitable drain such that any water that may collect within the external heat pump housing 54 will be safely drained away.

The system 10, which will be described hereinafter, includes a variety of mechanical and electrical elements that are controlled by a control box 72 which, in turn, is actuated by a conventional thermostat 74. When the thermostat 74 has turned on the heat pump to generate heat for the building, a timer 75 is actuated. When a preset period of time has passed and the building is not up to the desired temperature, the timer turns on the furnace to supplement the heat pump and quickly warm the building. Using the timer 75 to determine when the furnace should be activated prevents the temperature in the building from dropping to an uncomfortable level before the furnace comes on. The timer 75 is adjustable so that experience and personal preference can determine what time delay affords the greatest level of comfort.

The blower 16 has enough capacity to pass sufficient air through the heat exchanger 25 and the by-pass 48 and allow efficient operation of the furnace. If the by-pass 48 where not provided, all of the air would be forced through the heat exchanger which would offer too great a restriction to the full air flow and would cause insufficient air to circulate past the condenser, resulting in inefficient operation. If, however, a sufficiently large furnace is used so that adequate air can flow past the condenser 46 and through the heat exchanger, the by-pass 48 can be eliminated.

The heat pump 40 includes an evaporator thermometer 80 which is adapted to sense evaporator ambient temperature; and when the evaporator ambient temperature drops below some predetermined level, such as 0 degrees F., the operation of the heat pump 40 will be turned off, as will be described hereinafter.

In use the system 10 is actuated by means of a 3-position thermostat 74 mounted within the usable portion of the building 12. The thermostat 74 is of a conventional type and may be purchased from a variety of suppliers, such as the Honeywell Corporation of Minneapolis, Minnesota. The thermostat 74 includes several thermostat elements which are adapted to actuate the blower 16 and turn on the heat pump 40 when the temperature in the building drops below a first predetermined level. When this occurs, the air from the cold-air return 14 travels through the condenser 46 to the hot-air duct 20 via blower 16. At this time the heat pump 40 is activated such that the fluid heat transfer medium, such as Freon, in the heat pump 40 is evaporated at low pressure in the evaporator 56. The heat for this is drawn from the atmosphere due to the fan 62 drawing air from the outside through the vent 64 past the evaporator 56 prior to exhausting the air back into the atmosphere via vent 66. The work of transporting the Freon from low pressure to high pressure is done by the compressor 50. Thus, the Freon passes through a conduit 60, the 4-way valve 52, to compressor 50, and thereupon is directed to the condenser 46. The compressor 50 draws vapors from the conduit 60 and compresses it to a desired higher pressure. In the condenser 46 the vapor is condensed at that higher pressure and gives off heat in so doing. The air passing by the condenser 46 is heated by the condenser 46. The air is then communicated via blower 16 to the by-pass duct 48 to the hot-air duct 20 for distribution throughout the building 12. This arrangement of obtaining heat from the atmosphere should function at acceptable levels to provide heat for the building 12 until the temperature outside drops below some predetermined degree, say 32 degrees F. At this point there may not be sufficient heat in the atmosphere for the heat pump to work. Accordingly, sufficient heat will not be provided to the interior of the building 12 and the heat pump will continue to operate in an attempt to raise the building temperature to the desired level. The timer 75 is actuated when the heat pump 40 is turned on. When the heat pump 40 has operated for a predetermined time (say 5 or 6 minutes) without the building temperature being raised to a level to cause the thermostat 74 to turn off the heat pump, the timer turns on the furnace 22 to supplement the heat pump. The use of the timer 75 prevents the building temperature from reaching an uncomfortable level before the furnace is turned on. When a temperature activated device is used to control the furnace, the thermostat 74 is responsive to a continued drop in temperature within the building 12 to activate the gas furnace 22 and the blower 16. When the furnace is activated, the flue lock 28 is opened. The air that is passing through the furnace 22 and past the combustion chamber 24 will be heated by the heat exchanger 25 and communicated to the hot-air duct 20 via the conduit 26. At the same time the hot gasses from the combustion chamber 24 will be communicated to the exhaust stack 32; and due to the vacuum effect generated by the rotating fan 62, the hot gases being exhausted through the conduit 30 into the exhaust stack 32 will be communicated to the conduits 68 and 70 and will pass over the evaporator 56. The heat from the hot gases exhausted from the furnace 22 and the hot-water heater 36 will provide the necessary heat for the heat pump 40 to function. The heat passing over the evaporator 56 will be absorbed thereby and transferred to the condenser 46 in the aforementioned manner, whereupon the air which passes through the heat pump 40 will be heated and communicated to the hot-air duct 20. When the outside temperature is very low, it may be desired that when the gas furnace 22 becomes active, suitable mechanical means connected to the vent 64 will function to close the same so as to provide a strong suction for drawing hot gases from the exhaust stack 32 and communicating the gases to the evaporator via the hot-gas conduits 68 and 70, while preventing the inclusion of low-temperature outside air.

When the outside temperature drops below some second predetermined value, say 0 degrees F., the same will by sensed by the thermostat 80 and the heat pump 40 will be turned off, whereupon heat for the building will be provided solely by means of the furnace 20. Each system will have to be experimented with individually to determine the appropriate temperature at which the system should be turned off, and it is believed that the heat pump should be turned off at a point where the temperature is so low that it is inefficient to operate the heat pump.

It should be noted that the heat pump works in the conventional manner in the summertime to provide cooling of the building 12. In the cooling mode the valve 52 functions to direct the flow of the fluid from the condenser 46 to the compressor 50 and onto the evaporator 56. In this mode the condenser 46 functions as an evaporator and the evaporator 56 functions as a condenser, thereby drawing heat from the air passing by the condenser 46, and that heat is exhausted to the atmosphere via the vent 66.

A solar panel 100, adapted to face the sun, has a cold solar air inlet 102 and a solar warmed air outlet 104. A cold solar air manifold 106 extends along a lower edge of the panel and a solar warmed air manifold 108 extends along an upper edge of the panel. A plurality of parallel spaced apart tubes 110 interconnect the manifold 106 and the manifold 108, and as air passes along the tubes 110 it is heated by the sun's rays.

The solar warmed air is pumped by a first pump means 112 to a heat storage means 114. The heat storage means 114 comprises an insulated enclosure 117 containing a plurality of trays 116 containing eutectic salt 118. Eutectic salt 118 has a meeting point of 89° F., and when melting from a solid to a liquid, considerable heat of fusion is absorbed at a constant temperature. Conversely, when the eutectic salt 118, solidifies from a liquid state to the solid state, considerable heat of fusion is given up at a constant temperature. The heat storage means, consequently, is able to store and/or release considerable amounts of heat energy without experiencing a large variation in temperature.

When the heat pump 40 is called upon to deliver heat, a second pump means 120 pumps solar warmed air from the heat storage enclosure 114 via a solar warmed air conduit 115 to a second chamber 57 surrounding the evaporator 56 where the heat of the solar warmed air is drawn by the evaporator 56 and utilized to heat the building 12. The solar warmed air is returned to the heat storage enclosure 114 by a conduit 117 which comprises underground drain tiles surrounding the building and serves as a source of heat to add warmth to the air passing therethrough by extracting heat from the warm ground surrounding the perimeter of the building foundation. A sump pump 119 removes any liquid present in the conduit 117. A conduit 121 interconnecting the conduit 70 and the conduit 117 drains away any liquid that may collect in the conduit 70. The thermostat 74 is programmed so that when there is sufficient solar warmed air to control the temperature of the building 12, the heat pump 40 in conjunction with the solar warmed air is the sole heat source and the gas furnace does not come on. The timer 75 turns on the furnace 22 when the heat pump and solar panel combined have been on for a predetermined length of time and the building has not reached the desired temperature.

The enclosure 114 collects and stores solar heat when there is more than sufficient solar radiation to keep the heat pump 40 heating the building 12 efficiently. At night and on cloudy days, when there is a need for heat but little or no solar heat available from the panel 100, enclosure 114 gives up its stored heat to avoid the need for the gas furnace to come on. A temperature sensor 122 measures the temperature of the solar warmed air in the manifold 108 and prevents the first pumping means 112 from pumping solar warmed air into the enclosure 114 when the solar warmed air drops below a predetermined temperature.

It can thus be seen that the present invention has provided a new and improved system for heating buildings and the like wherein a heat pump is used in combination with a gas furnace in such a manner that the system is very economical in that it reclaims the heat which is lost from gas furnaces. The present invention also provides a time means for activating the gas furnace when there is insufficient heat from the heat pump and a solar panel before the building temperature reaches an uncomfortable level.

It should be understood by those skilled in the art of heating systems that other forms of applicant's invention may be had, all coming within the spirit of the invention and scope of the appended claims.

Having thus described my invention what I claim is:

1. A heating system for a building comprising:
   a hot-air duct;
   a cold-air return;
   a gas furnace having an inlet communicating with said cold-air return and an outlet communicating with said hot-air duct, said furnace having a combustion chamber and a heat exchanger for heating the air passing thereby from said cold-air return to said hot-air duct;
   an exhaust stack for exhausting the hot gases from said combustion chamber;
   a heat pump comprising a condenser with an inlet communicating with said cold-air return and an outlet communicating with said hot-air duct, said condenser heating the air passing thereby from said cold-air return to said hot-air duct, said heat pump having an evaporator located externally of said building for drawing heat from the air passing thereby;
   a fan for passing air by said evaporator and heat exchanger;
   a first conduit means communicating the heat stack to a first chamber surrounding said evaporator so that the heat exhausted by said furnace may be drawn from the air via said evaporator and utilized to provide heat for said building, said furnace and said heat pump respectively communicating said cold-air return to said hot-air duct;
   a solar panel for heating air passed therethrough having a cold solar air inlet and a solar warmed air outlet; and a second conduit means communicating the solar warmed air to a second chamber surrounding said evaporator so that heat from the solar warmed air may be drawn from the solar warmed air via said evaporator and utilized to provide heat for said building.

2. The heating system defined in claim 1 wherein said evaporator is mounted within an enclosed housing externally of said building, said housing having movable baffles being closeable such that said fan creates a suction for drawing air from said heating stack through said first chamber via said conduit.

3. The heating system defined in claim 1 comprising:
a thermostat being responsive to a first predetermined temperature for activating said heat pump; and
a timer for activating said gas furnace when said heat pump has been operating a predetermined length of time.

4. The heating system defined in claim 2 further comprising a thermostat mounted externally of said housing and adapted to terminate operation of said heat pump when the temperature outside said building drops below a predetermined amount.

5. The heating system defined in claim 1 further comprising a heat storage means interposed between the solar panel and said second chamber to store solar heat when there is more solar heat available than needed.

6. The heating system defined in claim 5 further comprising a first pump means to move the solar warmed air from the solar panel to the heat storage means, and a second pump means to move the solar warmed air from the heat storage means to the second chamber.

7. The heating storage system as defined in claim 5 wherein the heat storage means comprises:
an insulated enclosure into which the solar warmed air is pumped; and
a tray of eutectic salt contained in the enclosure, said salt melting to absorb heat and crystalizing to give up heat.

8. The heating system as defined in claim 6 further comprising a temperature sensor to measure the temperature of the solar warmed air and turn off the first pump means when the solar warmed air temperature is below a predetermined level.

* * * * *